(12) United States Patent
Kania et al.

(10) Patent No.: US 10,929,434 B2
(45) Date of Patent: *Feb. 23, 2021

(54) DATA WAREHOUSE SINGLE-ROW OPERATION OPTIMIZATION

(71) Applicant: International Business Machines Corporation, Armonk, NY (US)

(72) Inventors: Piotr L. Kania, Cracow (PL); Bartlomiej T. Malecki, Slomniki (PL); Michal S. Paluch, Cracow (PL); Konrad K. Skibski, Zielonki (PL)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 16/424,548

(22) Filed: May 29, 2019

(65) Prior Publication Data
US 2019/0278784 A1 Sep. 12, 2019

Related U.S. Application Data

(63) Continuation of application No. 14/945,768, filed on Nov. 19, 2015, now Pat. No. 10,353,924.

(51) Int. Cl.
*G06F 16/00* (2019.01)
*G06F 16/28* (2019.01)

(52) U.S. Cl.
CPC .................... *G06F 16/283* (2019.01)

(58) Field of Classification Search
CPC .................................................. G06F 16/283
See application file for complete search history.

(56) References Cited

U.S. PATENT DOCUMENTS

| | | | |
|---|---|---|---|
| 6,363,391 B1* | 3/2002 | Rosensteel, Jr. | G06F 16/252 |
| 8,732,148 B2 | 5/2014 | Jensen | |
| 8,768,927 B2 | 7/2014 | Yoon | |
| 9,619,535 B1* | 4/2017 | Kapoor | G06F 16/254 |
| 2009/0210445 A1 | 8/2009 | Draese | |
| 2011/0004630 A1* | 1/2011 | LaBerge | G06F 16/211 |
| | | | 707/796 |
| 2011/0016157 A1* | 1/2011 | Bear | G06F 16/22 |
| | | | 707/804 |
| 2012/0011096 A1* | 1/2012 | Aggarwal | G06F 16/283 |
| | | | 707/602 |
| 2013/0346428 A1* | 12/2013 | Viehland | G06F 16/22 |
| | | | 707/756 |

(Continued)

OTHER PUBLICATIONS

IBM, Appendix P, list of patents or patent applications treated as related, filed herewith, 2 pages.

(Continued)

*Primary Examiner* — Jared M Bibbee
(74) *Attorney, Agent, or Firm* — Gilbert Harmon, Jr.

(57) ABSTRACT

An approach for optimizing single-row operations in a data warehouse. Single-row operations are determined based on receiving database operations. Extends identifiers are received based on the single-row operations. Single-row usage statistics are maintained for extends identifiers based on single-row operations. A logical sequence of the extends identifiers in extends lists stores are sorted based on single-row usage statistics and the logical sequence is maintained based on determining further single-row operations.

20 Claims, 4 Drawing Sheets

(56) References Cited

U.S. PATENT DOCUMENTS

2014/0095438 A1    4/2014    Marwah
2014/0095448 A1    4/2014    Marwah
2016/0092507 A1*    3/2016    Ng ......................... G06F 16/22
                                                                                                                                                                          707/610

OTHER PUBLICATIONS

Kania et al., "Data Warehouse Single-Row Operation Optimization", U.S. Appl. No. 14/945,768, filed Nov. 19, 2015, 30 pages.
Daniel J. Abadi et al., "ColumnStores vs. RowStores: How Different Are They Really?", Jun. 9, 2008, SIGMOD, pp. 1-14 (Year: 2008), As cited by Examiner within Office Action for U.S. Appl. No. 14/945,768 dated Jun. 25, 2018.

\* cited by examiner

DATA WAREHOUSE SINGLE-ROW OPERATION OPTIMIZATION

BACKGROUND OF THE INVENTION

The present invention relates generally to data warehousing data management and more specifically to optimizing single-row operations within a data warehouse.

Data warehouses are central repositories of integrated data from a plurality of disparate sources. Data warehouses store current and historical data and are used for creating analytical reports for users throughout an enterprise. Data in data warehouse systems are stored in multiple physical locations called extends. Data warehouse queries typically read and process a large amount of data (known in the art as massive data) and those operations search through an entire set of data (extends) in order to output a final response. The sequence in which extends are read by the data warehouse are inconsequential as all data is read.

When single-row operations (requiring only one row to be found) are periodically processed, records are read and operated on in small group of extends. Single-row operations are processed for usage and/or customer specific needs and related typically to periodical data verification, housekeeping and/or audit of records created and/or updated in a specific time period. In the case of processing single-row operations, the sequence in which extends are read by the data warehouse becomes a factor to performance of data retrieval.

SUMMARY

As disclosed herein, a method for optimizing single-row operations in a data warehouse, the method comprising: determining one or more single-row operations based on receiving database operations; receiving one or more extends identifiers based on the one or more single-row operations; maintaining one or more single-row usage statistics for the one or more extends identifiers based on the one or more single-row operations; sorting a logical sequence of the one or more extends identifiers in one or more extends lists stores based on the one or more single-row usage statistics; and maintaining the logical sequence based on determining a further one or more single-row operations. A computer system and a computer program product corresponding to the above method are also disclosed herein.

DETAILED DESCRIPTION

Embodiments of the present invention provide systems, methods and computer program products for changing the logical order of extends in a data warehouse to optimize searching records when executing single-row (S-R) operations.

A feature of a data warehouse is that each extends instance comprises metadata containing various statistical information about the content stored. The metadata information comprises data such as, but not limited to, minimal and maximal values for each column stored in an extends. Before reading physical data from a database, a data warehouse database engine first checks low level statistics to filter records that are not required for processing in a query.

Embodiments of the present invention monitor execution of data warehouse operations, determines when single-row operations are executed and logs 'hits' or access frequency that occur in each extends. Based on extends hits, a sort sequence of extends is determined and maintained to prioritize the order in which extends are processed by a data warehouse during single-row operations. Single-row operations are optimized as the logical sequencing of extends increases the probability of finding records of interest earlier in a search and continued read operations of all extends can be abandoned.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
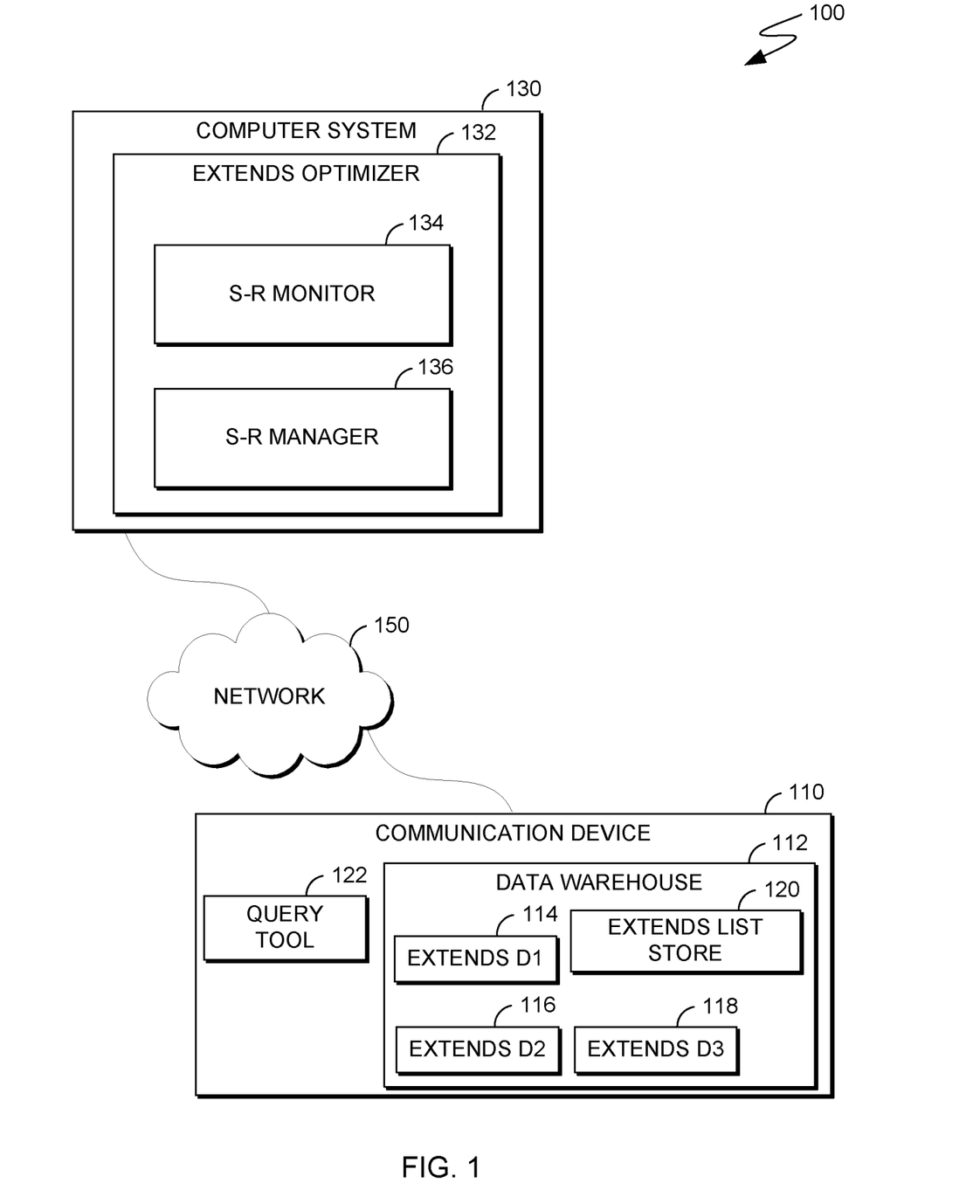
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 comprises communication device 110 and computer system 130, interconnected via network 150. Communication device 110 and computer system 130 can be desktop computers, laptop computers, specialized computer servers, or the like. In certain embodiments, communication device 110 and computer system 130 represent computer systems utilizing clustered computers and components acting as a single pool of seamless resources via network 150. For example, such embodiments can be used in data center, cloud computing, storage area network (SAN) and network attached storage (NAS) applications. In general, communication device 110 and computer system 130 are representative of any electronic devices, or combination of electronic devices, capable of executing computer readable program instructions, as described in detail with regard to FIG. 4.

Network 150 can be, for example, a local area network (LAN), a wide area network (WAN) such as, the Internet, or a combination of the two and include wired, wireless, or fiber optic connections. In general, network 150 can be any combination of connections and protocols that will support communications between communication device 110 and computer system 130, in accordance with an embodiment of the present invention.

In one embodiment of the present invention, communication device 110 comprises data warehouse 112 and query tool 122. Data warehouse 112 can be a plurality of data warehouses 112 within communication device 110. Query tool 122 can be a plurality of query tools 122 used to retrieve and manage data within data warehouse 112 and comprises any combination of commercial or custom software products (not shown) associated with Data warehouse 112 data management. Data warehouse 112 can be described as a warehouse of current and historical data used for creating analytical reports for users throughout an enterprise. Data warehouse 112 can be operated by a plurality of database management systems (DBMS) and comprise any combination of commercial or custom software products (not shown) associated with operating and maintaining data warehouse 112.

In one embodiment of the present invention, data warehouse 112 further comprises extends D1 114, extends D2 116, extends D3 118 and extends list store 120. Extends D1 114, extends D2 116 and extends D3 118 can be a plurality of extends D1 114, extends D2 116 and extends D3 118 within data warehouse 112. Data and associated metadata in data warehouse 112 are stored in multiple physical locations. Extends D1 114, extends D2 116 and extends D3 118 represent physical locations comprising metadata and data used in the operation of a data warehouse 112 which can be distributed and/or integrated in a plurality of communication device 110. While data warehouse 112 depicts three extends (e.g., extends D1 114, extends D2 116 and extends D3 118), the number of extends used by data warehouse 112 are based on predetermined data warehouse 112 implementation needs. Further, each extends metadata comprises statistical information such as, but not limited to, minimal and maximal values for each column in an extends.

In one embodiment of the present invention, extends list store 120 can be a plurality of extends list stores 120 within data warehouse 112. Extends list store 120 is a list of extends (e.g., extends D1 114, extends D2 116 and extends D3 118) that data warehouse 112 uses as source reference to search metadata and data in each identified extends in extends list store 120. Extends list store 120 is modified by embodiments of the present invention to maintain access frequency (i.e., hit count) and extends identifier (ID) logical sequence.

In one embodiment of the present invention, computer system 130 comprises extends optimizer 132. Extends optimizer 132 further comprises S-R monitor 134 and S-R manager 136. Extends optimizer 132 comprises any combination of commercial or custom software products (not shown) associated with operating and maintaining extends optimizer 132. It should be noted that, extends optimizer 132 can be implemented as an integrated or distributed application.

In one embodiment of the present invention, S-R monitor 134 can be a plurality of S-R monitors 134 within extends optimizer 132. S-R monitor 134 monitors data warehouse 112 operation for single-row database operations (e.g., query, update, delete). Single-row operations can be determined by examining query statement logic for single-row operations sent by query tool 122 toward data warehouse 112. Single-row operations can be determined by examining received data warehouse 112 operation statements such as, but not limited to, (1) unique value field, using 'where' clause (e.g., where id=4); (2) explicitly, using 'select top 1' clause; and (3) logically using 'exists' clause. In case (1) unique value field, the definition of unique key is data that can contain one of a specific value. Known by one skilled in the art, key fields are defined in database schema and provide attributes to indicate which key fields contain unique values. In case (2) explicitly, the 'top 1' parameter is an option in a 'select' clause resulting in a single-row result. In case (3) logically, where exists clause is satisfied when the first occurrence of a value is found (e.g., logical True/False).

In the prior examples, a single-row operation is identified and when data warehouse 112 finds a record of interest for the single-row operation in an extends, S-R monitor 134 receives the extends ID (e.g., extends D1 114, extends D2 116 and extends D3 118) from data warehouse 112. It should be noted that Structured Query Language (SQL) is an example of a plurality of query languages that can be used with data warehouse 112 operations. When a single-row operation is processed, S-R monitor 134 sends the extends ID (e.g., extends D1 114, extends D2 116 and extends D3 118) toward S-R manager 136.

In one embodiment of the present invention, S-R manager 136 can be a plurality of S-R managers 136 within extends optimizer 132. S-R manager 136 determines extends hits and logical sort order of extends ID in extends list store 120 based on single-row hit statistics (usage) in extends list store 120. S-R manager 136 stores the extends hits and logical sort order of extends ID in extends list store 120. It should be noted that sorting of extends can be performed by a range of predetermined methods such as, but not limited to, real-time (i.e., during each extends hit occurrence), periodically by a predetermined schedule and based on a predetermined hit count threshold. In one embodiment of the present invention, after an extend hit occurs, a compare of the hit value of the current extends ID with a logically adjacent extends ID can determine if a sequence change in extends search order is needed. A single exchange method based on exchanging extends sequence position with adjacent extends produces a gradual sort, similar to a single pass bubble sort, to reduce rapid and drastic change of extends list store 120 sequence content. In another embodiment of the present invention, predetermined periodic comparison sorts can be executed. Sort methods such as, but not limited to, bubble sort, comb sort, heapsort, merge sort and quicksort are known by one skilled in the art as comparison sorts. These sort methods can logically sequence extends list store 120 based on access frequency (i.e., hit count) and can be combined with other attributes such as, but not limited to, a range of last hit dates to group extends ID's and reduce the collection of each logical sort.

Figure 2A:
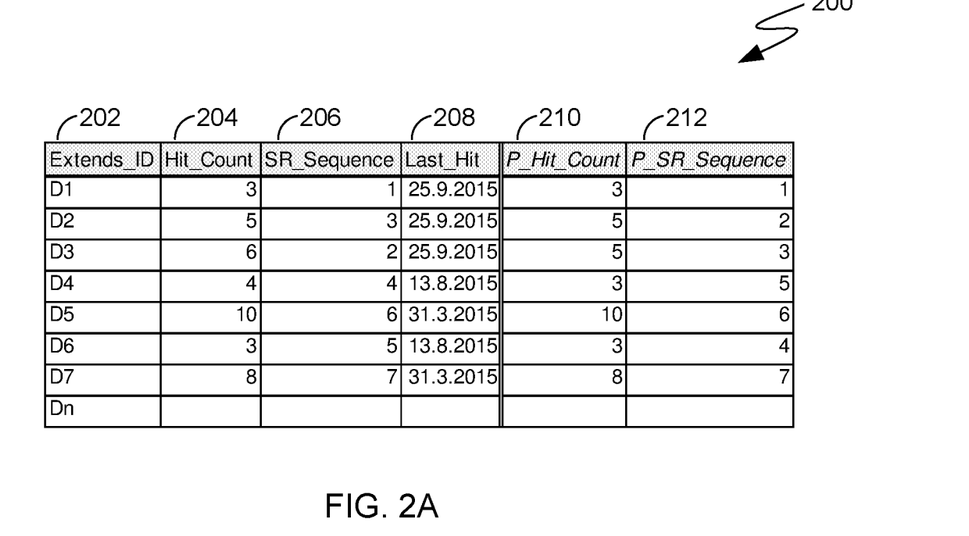
FIG. 2A depicts an extends list store with sample single-row usage tracking statistics, in accordance with an embodiment of the present invention.

FIG. 2A depicts an extends list store with sample single-row usage tracking statistics, in accordance with an embodiment of the present invention. The extends list store sample 200 represents one aspect of data that can be contained in extends list store 120.

Heading 202 Extends_ID is an identifier of Extends. The values of extends range from D1 to Dn, where Dn is any number of extends datasets in the sample table (i.e., store). It should be noted that extends identifier format is based on data warehouse 112 implementation needs.

Heading 204 Hit_Count is a hit count of Extends ID. Heading 204 Hit_Count can be an added data column in extends list store 120 as part of data warehouse 112. The value in each row of heading 204 Hit_Count column is based on the number of times heading 202 Extends_ID is found to contain data for a single-row operation and is calculated by S-R manager 136.

Heading 206 SR_Sequence is a single-row logical order (i.e., priority sequence) determined by S-R manager 136. Heading 206 SR_Sequence can be an added and/or existing data column in extends list store 120 as part of data warehouse 112. As heading 204 Hit_Count values increase, the logical order can change when compared to other heading 204 Hit_Count values associated to heading 202 Extends_ID values. The single-row logical order are used by data warehouse 112 in single-row searches to sequence searching of extends.

Heading 208 Last_Hit is a last extends hit date stamp. Heading 208 Last_Hit can be an added data column in extends list store 120 as part of data warehouse 112. When a value of heading 204 Hit_Count increases for an extends ID (e.g., heading 202 Extends_ID) a current date stamp is recorded. Heading 208 Last_Hit value depicted as day month year and is a representation of one embodiment of the present invention. Heading 208 Last_Hit can be used in conjunction with heading 204 Hit_Count values to determine a new sequence of extends that have been accessed recently. For example, a predetermined value of 24 hours is established to contribute to the sequence process of S-R manager 136. In this example, heading 206 SR_Sequence value considers heading 208 Last_Hit dates of 25.9.2015 to group extends associated to the sorting operation. Older values heading 208 Last_Hit dates of value 25.9.2015 contain heading 206 SR_Sequence value greater than heading 206 SR_Sequence values within the 25.9.2015 grouping.

Heading 210 P_Hit_Count and heading 212 P_SR_Sequence are previous values of respective heading 204 Hit_Count and heading 206 SR_Sequence hit count of Extends. Heading 210 P_Hit_Count and heading 212 P_SR_Sequence are provided for illustrative purposes and are not required in embodiments of the present invention. For example, heading 202 Extends_ID values D2 and D3 are heading 210 P_Hit_Count values of 5 and 5 respectively. Heading 212 P_SR_Sequence value is 3 for heading 202 Extends_ID value D3 priority increased to heading 206 SR_Sequence value of 2 when heading 204 Hit_Count increased to value 6 for 25.9.2015 group of heading 208 Last_Hit. Note that heading 202 Extends_ID value D5 is heading 204 Hit_Count value 10 but is not heading 206 SR_Sequence value of 1 since heading 202 Extends_ID value D5 is older and not part of heading 208 Last_Hit value 25.9.2015 grouping.

Figure 2B:
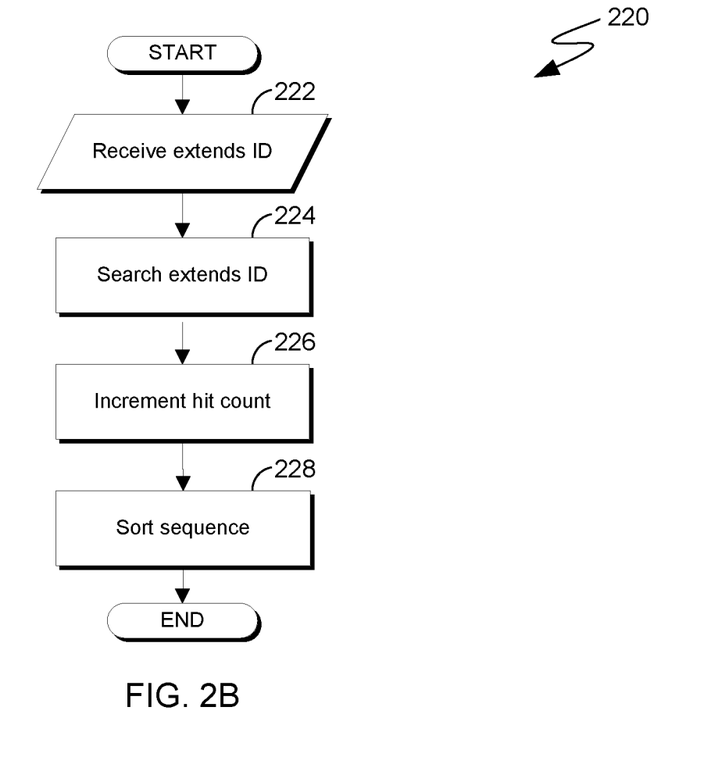
FIG. 2B is a flowchart depicting single-row usage tracking, in accordance with an embodiment of the present invention.

FIG. 2B is a flowchart depicting single-row usage tracking, in accordance with an embodiment of the present invention. The single-row usage tracking flow sample 220 represents one embodiment of the present invention.

Step 222 Receive Extends ID is the extends ID of the extends found to contain records of interest in a single-row operation.

In step 224 Search extends ID, searches for the extends ID from step 222 Receive Extends ID in extends list store 120. Results of step 224 Search extends ID comprise data such as, but not limited to, extends ID, hit count, single-row sequence and last hit date stamp (e.g., heading 202 Extends_ID, heading 204 Hit_Count, heading 206 SR_Sequence and heading 208 Last_Hit).

Step 226 Increment Hit Count increments current hit count from step 224 Search extends ID for the extends ID being updated.

In step 228 Sort Sequence, the hit count from step 226 Increment Hit Count is compared to other hit counts in extends list store 120 for the extends ID's current system date. If the hit count is a high access frequency as compared to logically adjacent extends ID's having a low access frequency, the extends ID sequence position can be exchanged. It should be noted that, some embodiments of the present invention can perform comparison sorts such as, but not limited to, bubble sort, comb sort, heapsort, merge sort and quicksort periodically based on a predetermined threshold of usage statistics updates and/or a predetermined schedule. When step 228 Sort Sequence completes processing, respective extends ID's are logically moved higher in extends list store 120.

Figure 3:
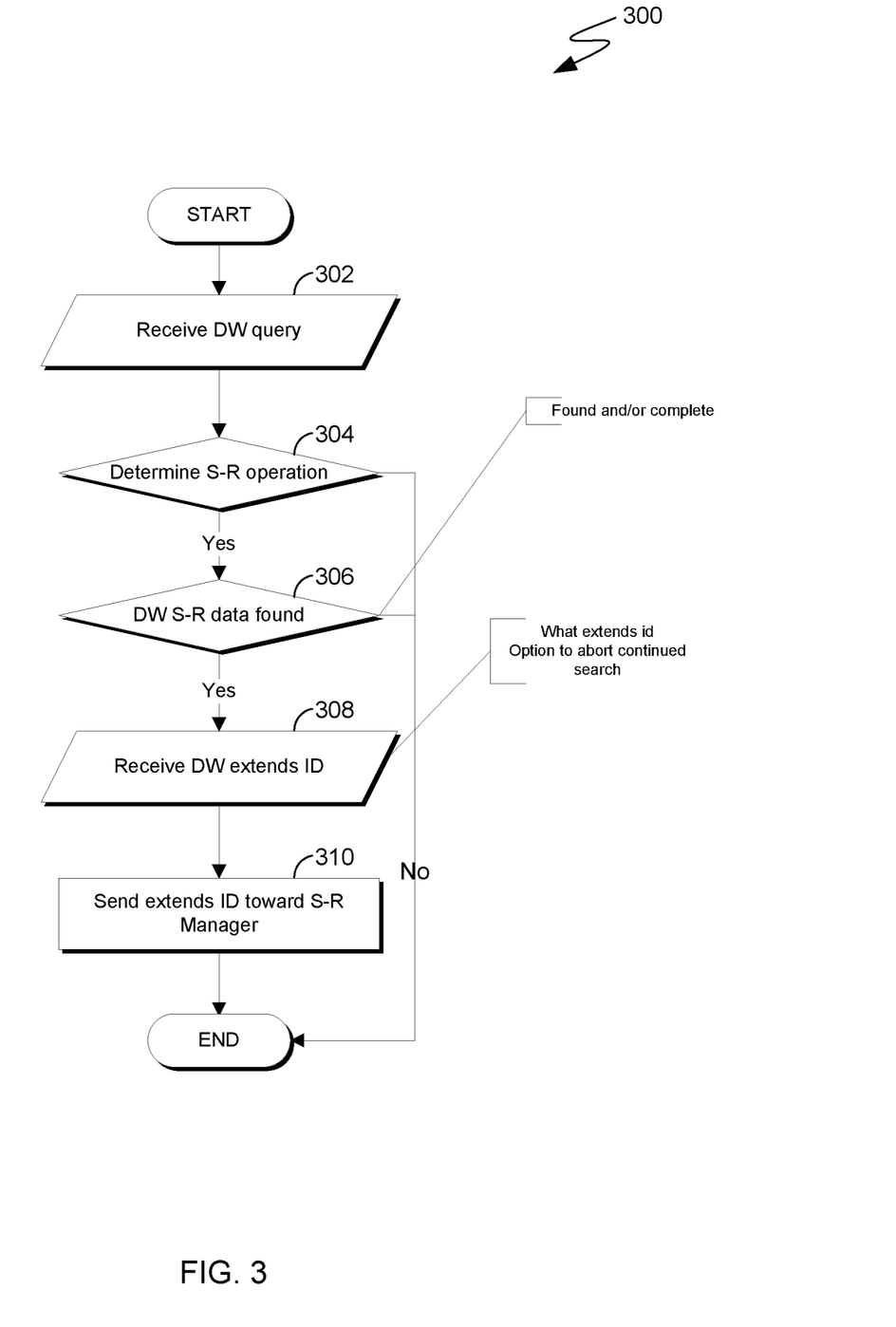
FIG. 3 is a flowchart depicting single-row operations monitoring, in accordance with an embodiment of the present invention.

FIG. 3 is a flowchart depicting single-row operations monitoring, in accordance with an embodiment of the present invention. Step 302 Receive DW query in S-R monitor flow diagram 300, receives a query sent toward data warehouse 112 for processing. Embodiments of the present invention can retrieve and/or receive query contents and/or portions of query syntax to determine single-row operations by data warehouse 112.

Step 304 Determine S-R operation, analyzes and determines if a single-row operation is requested for processing by data warehouse 112. A single-row query can be determined by previously described techniques such as, but not limited to, (1) unique value field; (2) explicitly (using select top 1); and (3) logically (where exists clause). It should be noted that determination techniques identified are in SQL language as an example and a plurality of query languages can have similar identifiers to determine if a query is a single-row operation. As an example, a given query for field 'id' that is equal to 44 (id=44) is processed in data warehouse 112. Data warehouse 112 searches for a single record (single-row) where 'id' is equal to 44 (id=44) by selecting the first extends ID in extends list store 120 and searches the identified extends (e.g., extends D1 114) metadata. If the extends metadata for extends D1 114 comprise key field "id", minimal value of 0 and maximal value of 25 then data warehouse 112 query processing advances to select the next extends ID (e.g., extends D3 118) from extends list store 120 and queries extends D3 118 metadata. Continuing with the example, extends D3 118 metadata comprises key field "id", minimal value of 30 and a maximal value of 100. Since 'id' equal to 44 (id=44) is within the metadata range data for extends D3 118, it is statistically probable that the data row (record of interest) exists in extends D3 118. When data warehouse 112 query processing finds 'id' equal to 44 (id=44) does exist in extends D3 118 then step 306 DW S-R data found evaluates as true otherwise data warehouse 112 query process continues until all extends in extends list store 120 are searched. If data warehouse 112 query processing finds no records to satisfy the query, then S-R monitor flow diagram 300 ends. It should be noted that some embodiments of the present invention can provide S-R monitor 134 with the ability to have data warehouse 112 query processing to abandon searching metadata after a single-row operation is satisfied with a record of interest. In other embodiments of the present invention, data warehouse 112 query processing automatically terminates when single-row results are located.

When step 306 DW S-R data found is true, step 308 Receive DW extends ID receives the extends ID where data warehouse 112 found the record of interest (e.g., extends D3 118).

Step 310 Send extends ID toward S-R Manager, sends the extends ID (e.g., extends D3 118) from step 308 Receive DW extends ID toward S-R manager 136 to update extends usage (i.e., a hit).

Figure 4:
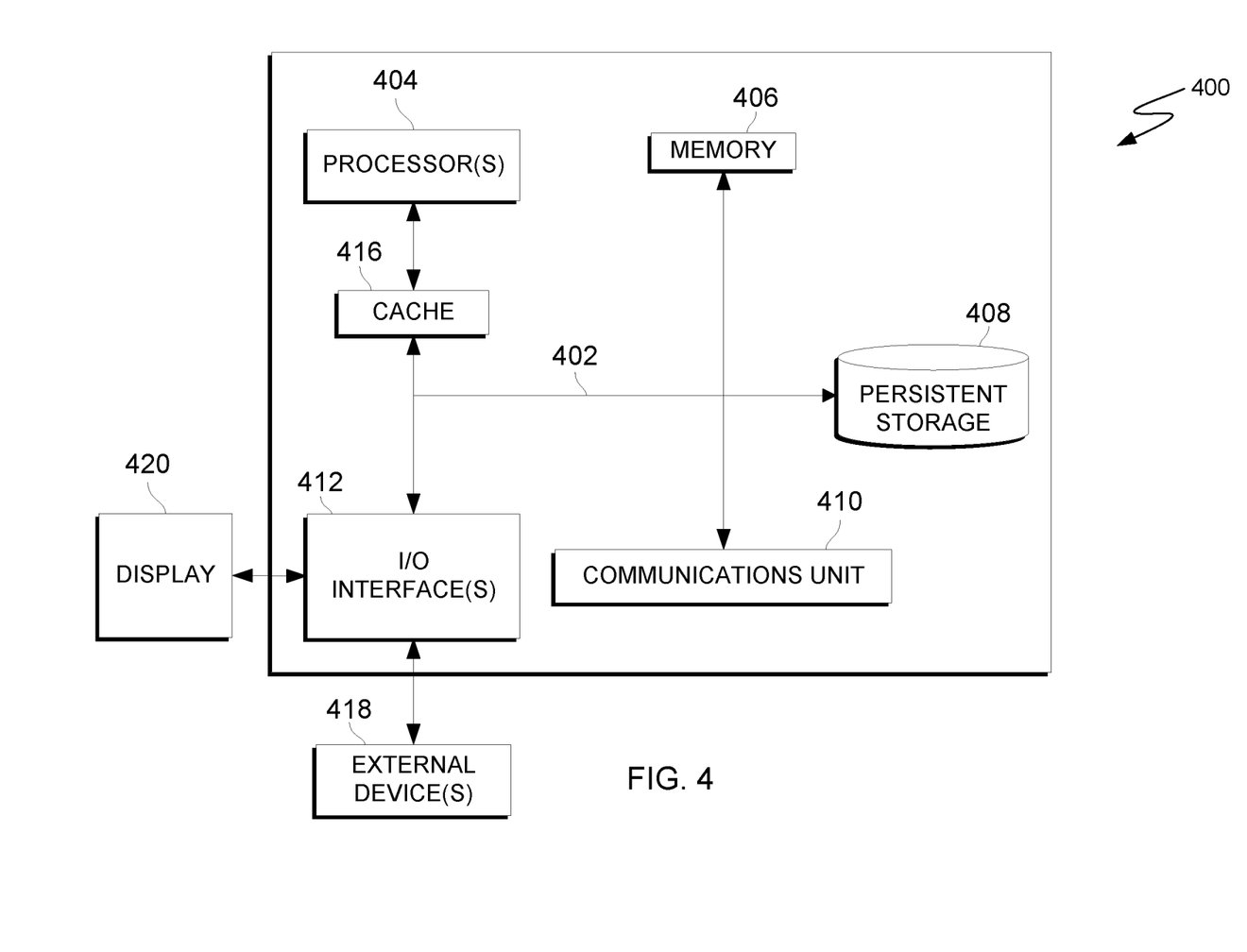
FIG. 4 depicts a block diagram of components of the server and/or the computing device, in accordance with an embodiment of the present invention.

FIG. 4 depicts a block diagram of components of communication device 110 and computer system 130 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410 and input/output (I/O) interface(s) 412.

Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as, a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punch-cards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing single-row operations in a data warehouse, the method comprising:
   determining one or more single-row operations based on receiving database operations;
   receiving one or more extends identifiers based on the one or more single-row operations;
   maintaining one or more single-row usage statistics for the one or more extends identifiers based on the one or more single-row operations;
   sorting a logical sequence of the one or more extends identifiers in one or more extends lists stores based on the one or more single-row usage statistics; and
   maintaining the logical sequence based on determining a further one or more single-row operations.

2. The method of claim 1, wherein determining the one or more single-row operations comprises examining one or more query statements, associated with the database operations for the one or more single-row operations.

3. The method of claim 1, wherein receiving the one or more extends identifiers is based on the one or more single-row operations locating records in an extends.

4. The method of claim 1, wherein the logical sequence further comprises grouping the one or more single-row usage statistics based on a last hit date wherein the last hit date can be a predetermined date range.

5. The method of claim 1, wherein maintaining the logical sequence is based on creating at least one of a real-time logical sequence, a periodic by a predetermined schedule logical sequence and a periodic by a predetermined hit count threshold logical sequence.

6. The method of claim 5, wherein the real-time logical sequence is based on exchanging the logical sequence values adjacent to the one or more extends identifiers in the one or more extends lists stores having a greater hit count compared to an extends identifier associated with the further one or more single-row operations.

7. The method of claim 5, wherein at least one of the periodic by a predetermined schedule logical sequence and the periodic by a predetermined hit count threshold logical sequence is based on a one or more comparison sort.

8. A computer program product for optimizing single-row operations in a data warehouse, the computer program product comprising:
   one or more computer readable storage media and program instructions stored on the one or more computer readable storage media, the program instructions comprising:

program instructions to, determine one or more single-row operations based on receiving database operations;

program instructions to, receive one or more extends identifiers based on the one or more single-row operations;

program instructions to, maintain one or more single-row usage statistics for the one or more extends identifiers based on the one or more single-row operations;

program instructions to, sort a logical sequence of the one or more extends identifiers in one or more extends lists stores based on the one or more single-row usage statistics; and program instructions to, maintain the logical sequence based on determining a further one or more single-row operations.

9. The computer program product of claim 8, wherein determine the one or more single-row operations comprises examining one or more query statements, associated with the database operations for the one or more single-row operations.

10. The computer program product of claim 8, wherein receive the one or more extends identifiers is based on the one or more single-row operations locating records in an extends.

11. The computer program product of claim 8, wherein the logical sequence further comprises grouping the one or more single-row usage statistics based on a last hit date wherein the last hit date can be a predetermined date range.

12. The computer program product of claim 8, wherein maintain the logical sequence is based on creating at least one of a real-time logical sequence, a periodic by a predetermined schedule logical sequence and a periodic by a predetermined hit count threshold logical sequence.

13. The computer program product of claim 12, wherein the real-time logical sequence is based on exchanging the logical sequence values adjacent to the one or more extends identifiers in the one or more extends lists stores having a greater hit count compared to an extends identifier associated with the further one or more single-row operations.

14. The computer program product of claim 12, wherein at least one of the periodic by a predetermined schedule logical sequence and the periodic by a predetermined hit count threshold logical sequence is based on a one or more comparison sort.

15. A computer system for optimizing single-row operations in a data warehouse, the computer system comprising:

one or more computer processors;

one or more computer readable storage media;

program instructions stored on the one or more computer readable storage media for execution by at least one of the one or more computer processors, the program instructions comprising:

program instructions to, determine one or more single-row operations based on receiving database operations;

program instructions to, receive one or more extends identifiers based on the one or more single-row operations;

program instructions to, maintain one or more single-row usage statistics for the one or more extends identifiers based on the one or more single-row operations;

program instructions to, sort a logical sequence of the one or more extends identifiers in one or more extends lists stores based on the one or more single-row usage statistics; and program instructions to, maintain the logical sequence based on determining a further one or more single-row operations.

16. The computer system of claim 15, wherein determine the one or more single-row operations comprises examining one or more query statements, associated with the database operations for the one or more single-row operations.

17. The computer system of claim 15, wherein receive the one or more extends identifiers is based on the one or more single-row operations locating records in an extends.

18. The computer system of claim 15, wherein the logical sequence further comprises grouping the one or more single-row usage statistics based on a last hit date wherein the last hit date can be a predetermined date range.

19. The computer system of claim 15, wherein maintain the logical sequence is based on creating at least one of a real-time logical sequence, a periodic by a predetermined schedule logical sequence and a periodic by a predetermined hit count threshold logical sequence.

20. The computer system of claim 19, wherein the real-time logical sequence is based on exchanging the logical sequence values adjacent to the one or more extends identifiers in the one or more extends lists stores having a greater hit count compared to an extends identifier associated with the further one or more single-row operations.

\* \* \* \* \*